(12) United States Patent
Hoang et al.

(10) Patent No.: US 9,222,583 B2
(45) Date of Patent: Dec. 29, 2015

(54) SPLIT GATE VALVE

(75) Inventors: Loc Gia Hoang, Houston, TX (US); Christopher Jude Gerace, Houston, TX (US)

(73) Assignee: Cameron International Corporation, Houston, TX (US)

( * ) Notice: Subject to any disclaimer, the term of this patent is extended or adjusted under 35 U.S.C. 154(b) by 396 days.

(21) Appl. No.: 13/083,384

(22) Filed: Apr. 8, 2011

(65) Prior Publication Data

US 2012/0256111 A1 Oct. 11, 2012

(51) Int. Cl.
| | |
|---|---|
| *F16K 3/18* | (2006.01) |
| *F16K 31/04* | (2006.01) |
| *F16K 31/50* | (2006.01) |
| *F16K 3/02* | (2006.01) |

(52) U.S. Cl.
CPC ............... *F16K 3/18* (2013.01); *F16K 3/0254* (2013.01); *F16K 31/047* (2013.01); *F16K 31/508* (2013.01)

(58) Field of Classification Search
CPC ....... F16K 3/18; F16K 3/0254; F16K 31/047; F16K 31/508; F16K 3/16; F16K 3/184; F16K 3/186; F16K 3/029
USPC ......... 251/176, 195–204, 326, 327, 321, 158, 251/167, 168, 170, 172, 174, 187, 193, 194, 251/368; 74/89, 89.23
See application file for complete search history.

(56) References Cited

U.S. PATENT DOCUMENTS

| | | | | | |
|---|---|---|---|---|---|
| 1,990,762 | A | * | 2/1935 | Vetrano ......................... | 251/176 |
| 2,192,331 | A | * | 3/1940 | Schaefer ....................... | 251/176 |
| 2,230,600 | A | * | 2/1941 | Olson ........................ | 137/246.13 |
| 2,306,490 | A | * | 12/1942 | Noble ........................... | 251/176 |
| 2,395,212 | A | * | 2/1946 | Blanchard et al. ......... | 122/451 R |
| 2,433,638 | A | * | 12/1947 | Volpin ..................... | 137/246.12 |
| 2,570,413 | A | * | 10/1951 | Volpin ..................... | 137/246.12 |
| 2,738,684 | A | * | 3/1956 | Shafer .......................... | 74/89.39 |
| 2,757,896 | A | * | 8/1956 | Sangster ....................... | 251/176 |
| 2,954,044 | A | * | 9/1960 | Volpin ..................... | 137/246.12 |
| 3,348,567 | A | * | 10/1967 | Volpin ..................... | 137/246.12 |
| 3,349,789 | A | * | 10/1967 | Crain et al. ............. | 137/246.22 |

(Continued)

FOREIGN PATENT DOCUMENTS

| | | |
|---|---|---|
| DE | 2627607 A1 | 1/1977 |
| EP | 1333207 A2 | 8/2003 |

(Continued)

OTHER PUBLICATIONS

Cameron's Surface System Publication #SW1997-092, 2006, 1-4.

(Continued)

*Primary Examiner* — Marina Tietjen
(74) *Attorney, Agent, or Firm* — Fletcher Yoder P.C.

(57) ABSTRACT

Provided in some embodiments is a system that includes a split gate valve including first and second gate sections coupled together and configured to move together within a cavity of the split gate valve between an open position and a closed position. The split gate valve includes a rolling actuator to reduce friction and to convert a rotational input into a linear motion to move the first and second gate sections between the open and closed positions. In other embodiments is provided a method that includes converting a rotational input into a linear motion to activate a split gate valve via a rolling actuator. The method also includes seating first and second gate sections of the split gate valve against opposite first and second seats to provide a double seal.

36 Claims, 3 Drawing Sheets

(56) References Cited

U.S. PATENT DOCUMENTS

| | | | |
|---|---|---|---|
| 3,586,034 A | 6/1971 | Karzeniowski | |
| 3,889,924 A * | 6/1975 | Karpenko | 251/249.5 |
| 3,989,223 A * | 11/1976 | Burkhardt et al. | 251/58 |
| 4,050,319 A * | 9/1977 | Stanley | 74/424.92 |
| 4,095,612 A * | 6/1978 | Hardcastle | 137/246.22 |
| 4,179,099 A | 12/1979 | Pierce, Jr. | |
| 4,325,535 A * | 4/1982 | Foster | 251/58 |
| 4,691,893 A * | 9/1987 | Akkerman et al. | 251/14 |
| 4,706,934 A | 11/1987 | Brown | |
| 4,779,649 A | 10/1988 | Balter | |
| 4,838,103 A * | 6/1989 | Weyer | 74/424.92 |
| 5,092,539 A * | 3/1992 | Caero | 244/99.9 |
| 5,195,722 A * | 3/1993 | Bedner | 251/199 |
| 5,295,907 A * | 3/1994 | Akkerman | 464/37 |
| 5,435,520 A * | 7/1995 | Vyvial | 251/196 |
| 5,865,272 A * | 2/1999 | Wiggins et al. | 185/40 R |
| 6,338,469 B1 | 1/2002 | Kalsi et al. | |
| 6,845,783 B1 * | 1/2005 | Sheppard | 137/243 |
| 6,918,574 B2 | 7/2005 | Hallden et al. | |
| 7,172,169 B2 * | 2/2007 | Biester | 251/129.11 |
| 7,255,328 B2 * | 8/2007 | Hunter | 251/326 |
| 7,523,916 B2 * | 4/2009 | Fenton | 251/94 |
| 7,975,983 B2 | 7/2011 | Comeaux et al. | |
| 2008/0217569 A1 | 9/2008 | Holliday | |
| 2009/0020719 A1 | 1/2009 | Ishigaki | |

FOREIGN PATENT DOCUMENTS

| | | |
|---|---|---|
| FR | 2529640 A1 | 1/1984 |
| GB | 563896 A | 9/1944 |
| GB | 758253 A | 10/1956 |
| GB | 2447345 A | 10/2008 |
| WO | 0114775 A1 | 3/2001 |
| WO | 2009045140 A1 | 4/2009 |

OTHER PUBLICATIONS

PCT Search Report, dated Mar. 6, 2012, PCT/US2011/061084; 7 pages.

Singapore Written Opinion & Search Report, dated May 8, 2013, SG201103281-0; 7 pages.

Singapore Written Opinion; Application No. 201307420-8; Dated Feb. 10, 2014; 12 pages.

PCT International Search Report and Written Opinion; Application No. PCT/US2011/061084; Dated Jun. 5, 2012; 21 pages.

PCT International Search Report; PCT/US2012/025826; Apr. 17, 2012, pp. 1-13.

* cited by examiner

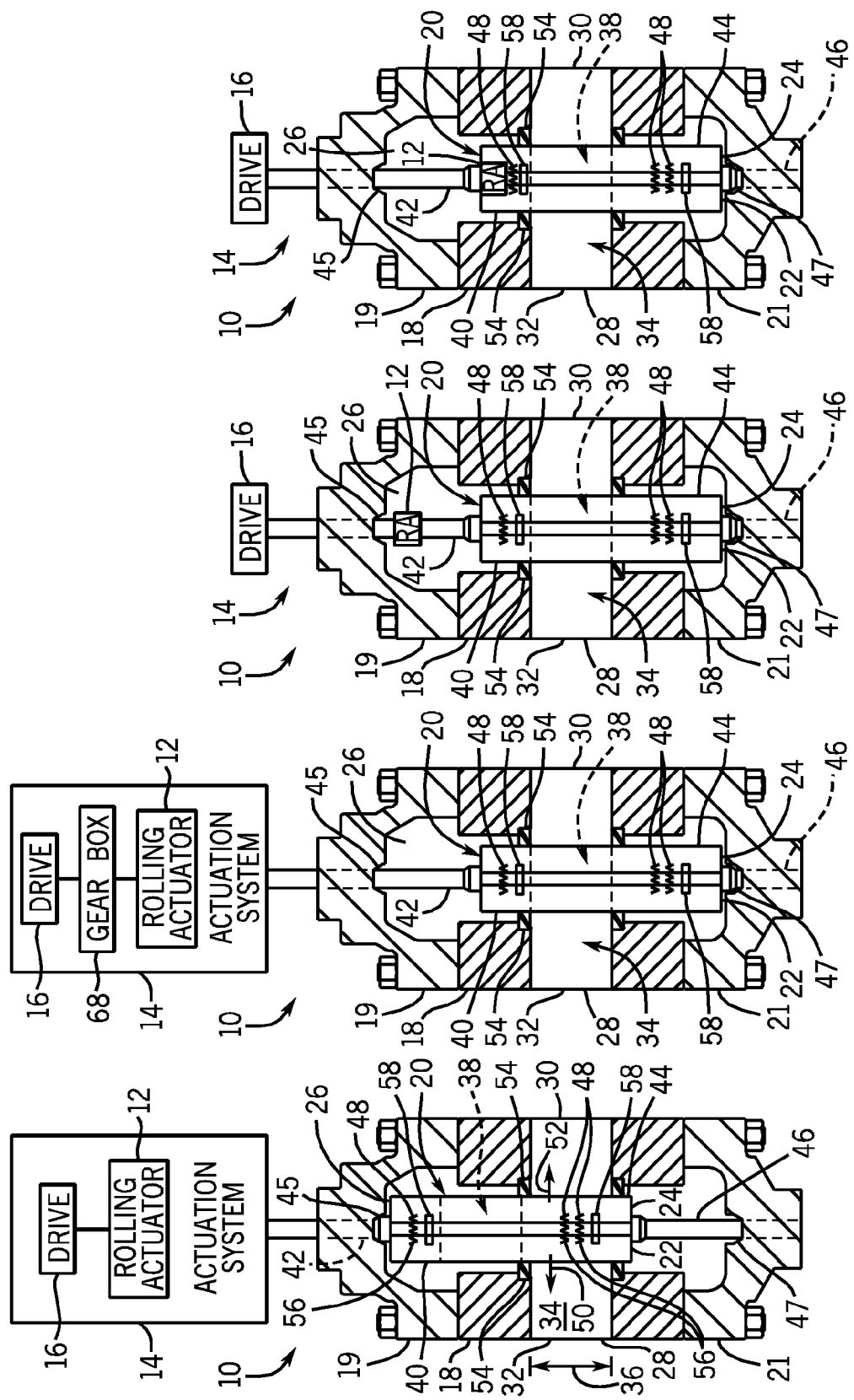

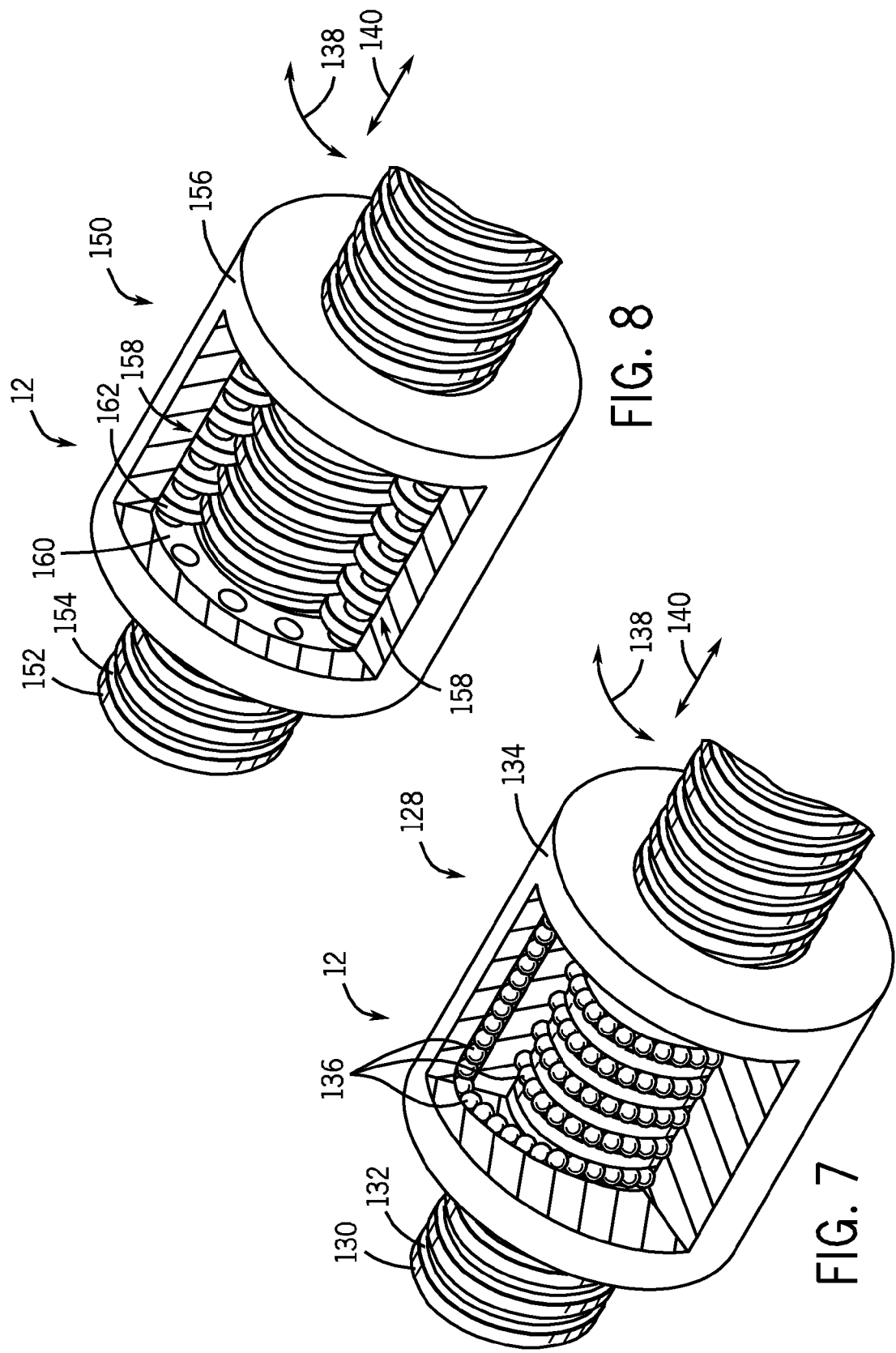

SPLIT GATE VALVE

FIELD OF THE INVENTION

This invention relates to gate valves. More particularly, the present invention relates to a split gate valve employing a rolling actuator.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gate valves are used in a wide variety of industries including oil and gas, power generation, food and beverage, water treatment, and the like. Gate valves include a gate that moves between an open and closed position to control the flow of fluid through the gate valve. Gate valves designed with large bores (e.g., approximately 5 inches or greater) and/or for operating under higher pressures (e.g., approximately 10,000 psi or greater) generally only include a single gate (e.g., a slab gate) to seal a single side of a passage through the gate valve. These large bore and/or high pressure gate valves present difficulties and additional test time in testing the seal since both sides of the gate valve need to be tested. Hence, there is a need to seal both sides of the gate valve, but designing the large bore and/or high pressure gate valve to seal both sides of the passage through the gate valve would require very high turning force to mechanically open and close the gate valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 1 is an exemplary schematic diagram of an embodiment of a split gate valve having a rolling actuator;

FIG. 2 is a schematic diagram of another embodiment of the split gate valve having the rolling actuator;

FIG. 3 is a schematic diagram of an embodiment of the split gate valve having the rolling actuator disposed within a cavity of the split gate valve;

FIG. 4 is a schematic diagram of an embodiment of the split gate valve having the rolling actuator disposed between a pair of gate sections within the cavity of the split gate valve;

FIG. 7 is a perspective cutaway view of an embodiment of a ball screw for use as the rolling actuator; and FIG. 8 is a perspective cutaway view of an embodiment of a roller screw for use as the rolling actuator.

DETAILED DESCRIPTION OF SPECIFIC EMBODIMENTS

Figure 6:
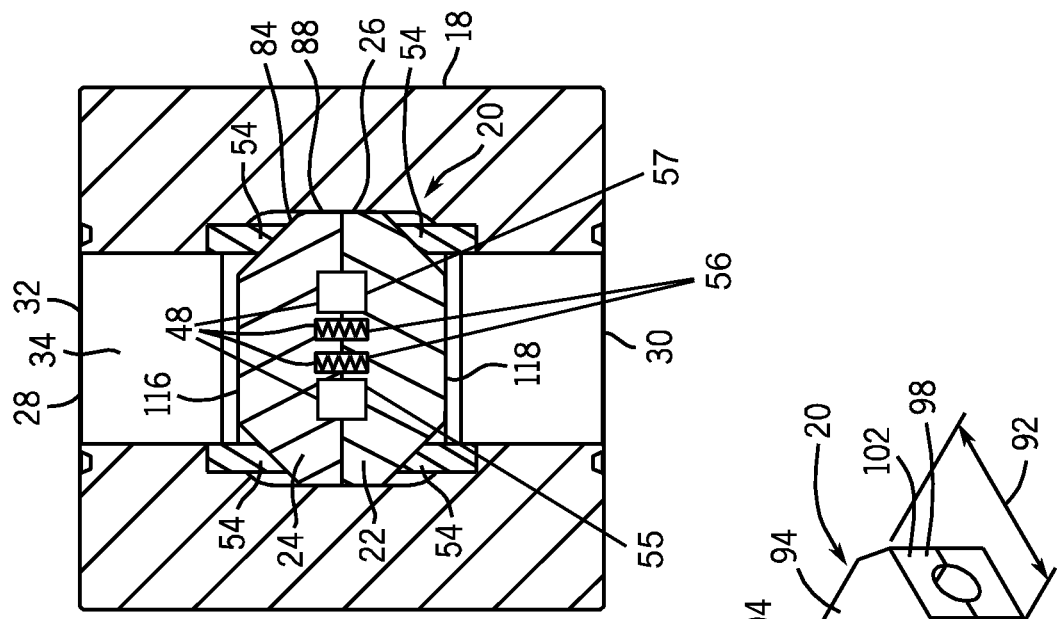
FIG. 6 is cross-sectional view of an embodiment of the body of the split gate valve with the pair of gate sections inserted within the body, taken along line 6-6 of FIG. 5.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments discussed below include a system and method that addresses one or more of the above-mentioned inadequacies of a conventional large bore and/or high pressure gate valve. In certain embodiments, a system includes a split gate valve that includes a pair of gate sections (e.g., slab gates) coupled together and configured to move together within a cavity of the split gate valve between an open position and a closed position. The pair of gates sections allows the split gate valve to control flows of two different fluids with each gate section. In addition, the two gates sections allow the isolation of a fluid within a cavity of the split gate valve. The split gate valve also includes a rolling actuator (e.g, ball screw or roller screw) configured to receive a rotational input (e.g, from a drive) and to convert the rotational input into linear motion to move the pair of gate sections between the open and closed positions. In some embodiments, the pair of split gates sections includes a biasing mechanism (e.g., one or more springs) to bias each gate section of the pair of the gate sections away from each other to form a double seal in the split gate valve. The formation of the double seal allows the filling of the cavity of the split gate valve to test each seal of the double seal at the same time. In certain embodiments, the split gate valve includes a body with an opening (e.g., generally rectangular) for the pair of gate sections configured for the insertion of the pair split gate sections and to closely fit the gate sections to minimize deflection.

FIG. 1 illustrates an embodiment of a split gate valve 10 having a rolling actuator 12. Typically, the split gate design limits the use of the split gate valve 10 to valves 10 with smaller bores (e.g., less than approximately 5 inches in diameter) and/or lower pressure ratings (e.g., less than approximately 10,000 psi) due to the amount of force required to move the split gate in large bore and/or high pressure valves 10. However, the rolling actuator 12 enables the application of less mechanical force or torque to the split gate valve 10 to open and close the valve 10 (i.e., move the gate). Thus, the rolling actuator 12 enables the use of the split gate design with large bore and/or high pressure valves 10 or any other combination of bore size and operating pressure that would require the rolling actuator 12 to reduce the amount of mechanical force or torque needed to open and close the valve 10 (e.g., a smaller bore size with high operating pressure or a larger bore size with a low operating pressure). The split gate valve 10 is generally configured to control a flow of fluid through the split gate valve 10 in various applications. For example, the split gate valve 10 may be employed in applications relating to oil and gas industries, power generation industries, petrochemical industries, and the like. For example, the split gate valve 10 may be coupled to a Christmas tree for petroleum and natural gas extraction. In some embodiments, the split gate valve 10 includes a large bore. For example, the bore of the split gate valve 10 may be at least approximately 5 inches in diameter. In other embodiments, the split gate valve 10 includes a smaller bore. For example, the bore of the split gate valve 10 may be less than approximately 5 inches. The diameter of the bore may range from approximately 3 to 20 inches, approximately 3 to 15 inches, approximately 3 to 10 inches, approximately 10 to 15 inches, or approximately 15 to 20 inches. For example, the bore may be approximately 3, 4, 5, 6, 7, 8, 9, 10, 11, 12, 13, 14, 15, 16, 17, 18, 19, 20 inches, or any other diameter therebetween. In other embodiments, the split gate valve 10 is configured to operate at a high pressure of at least approximately 10,000 pounds per square inch (psi). In some embodiments, the split gate valve 10 is configured to operate at pressure lower than approximately 10,000 psi. For example, the split gate valve 10 may operate at pressures ranging from approximately 5,000 to 30,000 psi or more. For example, the split gate valve 10 may operate at pressures ranging from approximately 5,000 to 25,000 psi, approximately 10,000 to 20,000 psi, approximately 5,000 to 10,000 psi, approximately 10,000 to 15,000 psi, approximately 15,000 to 30,000 psi, approximately 15,000 to 25,000 psi, approximately 20,000 to 30,000 psi, approximately 20,000 to 25,000 psi, or approximately 25,000 to 30,000 psi. In certain embodiments, the split gate valve 10 may include a bore (e.g., small bore size) of at least approximately 4 inches in diameter and be configured to operate at a pressure (e.g., high pressure) of at least approximately 10,000 psi. In other embodiments, the split gate valve 10 may include a bore (e.g., large bore size) of at least approximately 9 inches in diameter and be configured to operate at a pressure (e.g., low pressure) of at least 5,000 psi.

In the illustrated embodiment, the split gate valve 10 includes an actuation system 14 including a drive 16 and the rolling actuator 12. The actuation system 14 is coupled to a body 18 of the split gate valve 10. For example, the actuation system 14 may be coupled to a top portion of the body 18 via a bonnet 19. A bottom portion of the body 18 is also coupled to a bonnet 21. In certain embodiments, the split gate valve 10 may not include the bonnet 21 attached to the bottom portion of the body 18. Alternatively, split gate valve 10 may include a single body coupled to the actuation system 14. The body 18 may be constructed of cast iron, ductile iron, cast carbon steel, gun metal, stainless steel, alloy steels, corrosion resistant alloys, and/or forged steels. The split gate valve 10 includes a gate 20 (e.g., split gate) that include a pair of gate sections 22 and 24 disposed within a cavity 26 of the body 18, therein the gate sections 22 and 24 are configured to move between an open position and a closed position. As illustrated, the gate 20 is disposed in the closed position. In addition, as illustrated, each gate section 22 and 24 includes a rectangular cross-sectional profile. The body 18 of the split gate valve 10 includes an inlet 28 and an outlet 30 configured for a flow of a fluid through a bore 32 of the body 18 into a passage 34 of the split gate valve 10. In certain embodiments, the outlet 30 may act as an inlet allowing fluid flow into the cavity 26 from either side of the split gate valve 10. In some embodiments, the inlet 28 may act as an outlet and the outlet 30 may act as an inlet. As mentioned above, in certain embodiments, the bore 32 may include a diameter 36 of at least approximately 5 inches. For example, the diameter of the bore 32 may range from approximately 5 to 20 inches, approximately 5 to 15 inches, or approximately 5 to 10 inches, or approximately 10 to 15 inches. The passage 34 of the split gate valve 10 includes a passage 38 (indicated by dashes lines) through the gate 20 to allow flow through the split gate valve 10 from the inlet 28 to the outlet 30 when the gate 20 is in an open position (see FIGS. 2-4).

The split gate valve 10 is configured to open and close in response to an actuation force from the actuation system 14. In particular, the drive 16 is configured to provide a rotational input (e.g., rotational force or torque) to the rolling actuator. The drive 16 may be a manual drive or an automatic (e.g., powered) drive. For example, the drive 16 may include a handle or wheel configured to be rotated by an operator. By further example, the drive 16 may include a motor, such as an electric motor, a pneumatic motor, or a hydraulic motor. The rolling actuator 12 is configured to convert the rotational input received by the drive 16 into a linear motion (e.g., linear activation force) to move the gate 20 (i.e., the pair of gates sections 22 and 24) between open and closed positions. In certain embodiments, the rolling actuator 12 may include a ball screw or a rolling screw. The rolling actuator 12 is configured to reduce the amount of friction to operate the stem valve 10. In particular, the rolling actuator 12 reduces the amount of torque or force required to move the gate 20 within the split gate valve 10. The rolling actuator 12 is coupled to a top portion 40 of the gate 20 via a stem 42 (e.g., an operating stem) configured to facilitate the movement of the gate 20 between the open and closed positions. A bottom portion 44 of the gate 20 is also coupled to a stem 46 (e.g., a balancing stem). The stems 42 and 46 move along bores 45 and 47 of bonnets 19 and 21, respectively. In certain embodiments, where the split gate valve 18 includes a single body 18, the stems 42 and 46 may move along bores of the single body 18. Each of the stems 42 and 46 may be connected to both gate sections 22 and 24 via connectors. For example, both the top portions 40 and the bottom portions 44 of the gate sections 22 and 24 may form cavities to surround a T-connecter (see FIG. 5) located at the end of each of the stems 42 and 46 near to the gate 20.

As mentioned above, the gate 20 includes the pair of gate sections 22 and 24 (e.g., slab sections). The split gate arrangement of the gate 20 includes advantages over a single gate arrangement. For example, two different fluids on different sides of the split gate valve 10 may be separated from each other by the pair of gate sections 22 and 24. Also, a fluid may be pumped into the cavity 26 of the split gate valve 10 for isolation. For example, the cavity 26 may be filled with a fluid (e.g., liquid or gas) to further bias each gate section 22 and 24 away from each other to form seals. In addition, as mentioned above, fluid may be pumped into the cavity 26 from both sides of the split gate valve 10. Further, each gate section 22 and 24 may be constructed of a different material suitable for the fluid on its respective side of the split gate valve 10. For example, the material may be corrosion resistant, wear resistant, and/or chemical resistant. The gates sections 22 and 24 may be constructed of cast carbon steel, gun metal, stainless steel, alloy steels, corrosion resistant alloys, and/or forged steels. Also, as discussed in greater detail below, gate sections 22 and 24 form a double seal which allows the testing of each seal at the same time (i.e., simultaneously).

As to the details of the split gate arrangement of the gate 20, the pair of gates sections 22 and 24 include a biasing mechanism 48 disposed between them. The biasing mechanism 48 is configured to bias the gate sections 22 and 24 away from each other in directions 50 and 52, respectively. Each gate section 22 and 24 is biased against a seat 54 (e.g., annular seat) of the body 18 of the split gate valve 10 to form a double seal (i.e., a seal on each side of the valve 10). The seat 54 may be constructed of ceramic, cast iron, ductile iron, cast carbon steel, gun metal, stainless steel, alloy steels, corrosion resistant alloys, and/or forged steels. As illustrated, the biasing mechanism 48 includes a spring 56. In other embodiments, as illustrated in FIG. 6, the biasing mechanism 48 may include a cam mechanism 55 or an elastic material 57. The formation of a seal by each gate section 22 and 24 allows seal testing for each gate face (i.e., the inlet 28 and outlet 30 sides) to occur at a valve rated working pressure during the introduction of a test pressure into the cavity 26 of the seat valve 10.

The pair of gates sections 22 and 24 also includes a coupling mechanism 58 to couple the gate sections 22 and 24 together. Due to the coupling mechanism 58, the gate sections 22 and 24 are configured to move together within the cavity 26 of the split gate valve 10 between the open and closed positions. In particular, in response to a rotational input provided by the drive 16, the rolling actuator 12 converts the rotational input into a linear motion that jointly moves the coupled gate sections 22 and 24 between the open and closed positions. In certain embodiments, the coupling mechanism 58 may include a pin extending into slots with each gate section 22 and 24. The coupling mechanism 58 guides the movement of the gate sections 22 and 24 away and toward one another. In particular, the coupling mechanism 58 guides movement of the gate sections 22 and 24 towards the seat 54 in response to biasing force of biasing mechanism 48 (e.g., spring). The split gate valve 10 as described above allows rolling friction (via the rolling actuator 12) to reduce the work required to mechanically operate the valve 10, in particular, large bore and/or high pressure gate valves 10.

FIG. 2 illustrates an embodiment of the split gate valve 10 in an open position. As illustrated, the passage 38 through the gate 20 (i.e., gate sections 22 and 24) is aligned with the bore 32 of the inlet 28 and the outlet 30 to form the passage 34 through the split gate valve 10. The split gate valve 10 is as described in FIG. 1 except for an added gear box 68 in the actuation system 14. The gear box 68 is disposed between the drive 16 and the rolling actuator 12. The gear box 68 is configured to reduce the amount of rotational torque used to move the gate 20 (i.e., gate sections 22 and 24) between the open and closed positions. For example, the gear box 68 may include internal gearing coupled to the drive 16. For example, the internal gearing may include gear ratios ranging from 4:1 to 20:1. As described above, the rolling actuator 12 converts the rotational input from the drive 16 and the gear box 68 into a linear motion to move the pair of gates sections 22 and 24 between open and closed positions. The split gate valve 10 as described allows rolling friction (via the rolling actuator 12) to reduce the work required to mechanically operate the valve 10, in particular, large bore and/or high pressure gate valves 10.

FIGS. 3 and 4 illustrate embodiments of the actuation system 14 of the split gate valve 10. The split gate valve 10 is as described in FIG. 1 except that the rolling actuator 12 is disposed within the cavity 26 of the split gate valve 10. The rolling actuator 12 may be disposed within the cavity 26 of the split gate valve 10 when the environment within the cavity 26 is suitable for the actuator 12. In embodiment of FIG. 3, the rolling actuator 12 is disposed within the cavity 26 coupled to the stem 42 (e.g., the operating stem) outside of the gate sections 22 and 24. In the embodiment of FIG. 4, the rolling actuator 12 is disposed within the cavity 26 coupled to the stem 42 between the gate sections 22 and 24. In the embodiments of both FIGS. 3 and 4, as above, the rolling actuator 12 converts the rotational input from the drive 16 into a linear motion to move the pair of gates sections 22 and 24 between open and closed positions. The split gate valve 10 as described allows rolling friction (via the rolling actuator 12) to reduce the work required to mechanically operate the valve 10, in particular, large bore and/or high pressure gate valves 10.

Figure 5:
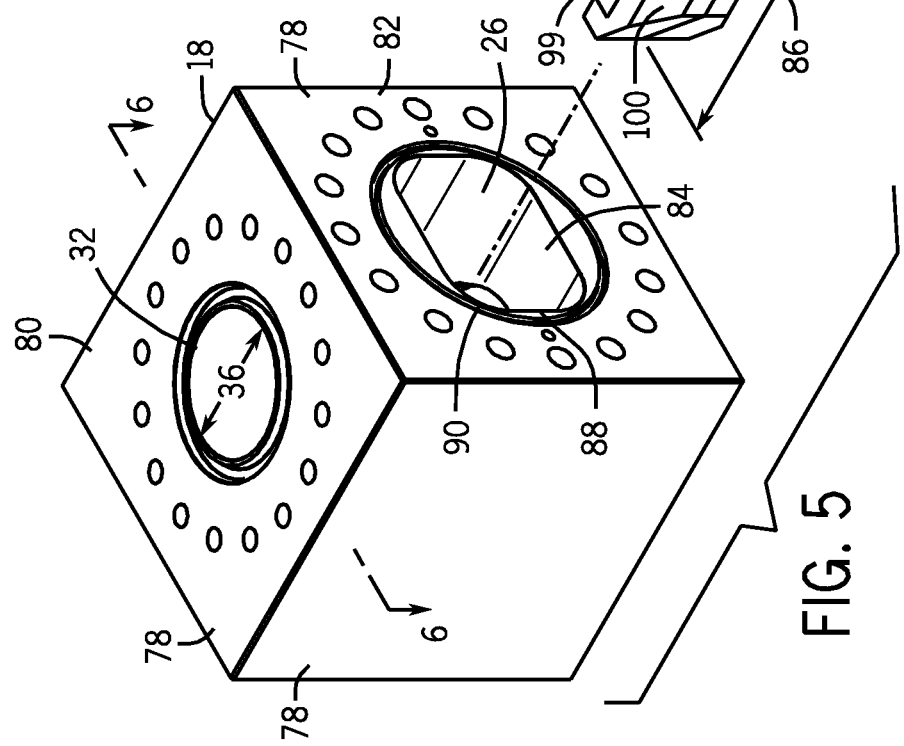
FIG. 5 is an exploded perspective view of an embodiment of a body of the split gate valve and the pair of gate sections.

FIG. 5 illustrates a perspective view of an embodiment of both the body 18 and the gate sections 22 and 24 for the split gate valve 10. As illustrated, the body 18 includes a cuboidal shape with a plurality of faces 78 (e.g., six). For example, the body 18 may be shaped as a right cuboid, a rectangular box, a rectangular heaxahedron, a right rectangular prism, square cuboid, square box, or right square prism. Alternatively, the body 18 may include a circular, oval, or oblong shape. As illustrated, the body 18 includes a pair of opposite faces 78 (e.g., face 80) including large bores 32 for the passage of fluid through the split gate valve 10. In certain embodiments, the bore 32 includes diameter 36 that may be at least approximately 5 inches in diameter. In some embodiments, the bore 32 includes diameter 36 that may be less than approximately 5 inches. The diameter 36 may range from approximately 3 to 20 inches, approximately 3 to 15 inches, or approximately 3 to 10 inches, or approximately 10 to 15 inches, or approximately 15 to 20 inches. For example, the diameter 36 may be 3, 4, 5, 6, 7, 8, 9, 10, 11, 12, 13, 14, 15, 16, 17, 18, 19, 20 inches, or any other diameter therebetween.

In addition, the body 18 includes a pair of opposite faces 78 (e.g., face 82) that each includes an opening 84 configured for the insertion of the pair of gate sections 22 and 24 along a length 86 of the gate sections 22 and 24. As illustrated, the opening 84 includes a rectangular perimeter 88 with rounded corners 90. In other embodiments, the perimeter 88 of the opening 84 may be rectangular with right-angled corners 90, square with rounded corners 90, or square with right-angled corners 90. Alternatively, the perimeter 88 of the opening 84 may be circular, round, oval, or oblong. In particular, the perimeters 88 of the opening 84 and the cavity 26 of the body 18 are configured to closely fit around the gate 20 when the gate 20 is inserted within the body 18. Thus, cavity 26 of the body 18 is configured to allow the gate 20 to consume nearly all of the space within the cavity 26. In particular, gate 20 engages substantially the entire cavity 26. Tightly fitting the cavity 26 of the body 18 to the gate 20 allows the reduction in size of the body 18 (i.e., reduction in material) minimizing the amount of deflection experienced by the split gate valve 10 under load pressure. In addition, using the generally rectangular opening 84 adds more material between the gate 20 and the body 18 (e.g., thicker walls) to increase the strength and rigidity of the body 18 as opposed to a circular opening. In other words, the rectangular opening 84 allows thicker walls surrounding the gate 20 that otherwise would be cut away with a circular opening. However, as mentioned above, the opening 84 may be circular, round, oval, or oblong as long as the shape meets the design criteria for the split gate valve 10 such as fitting the gate 20 and the seat 54.

The shape of the perimeter 88 of the opening 84 and the cavity 26 depends on a cross-sectional area of the gate 20 along a width 92 of the gate 20. As illustrated, each gate section 22 and 24 includes a main body 94 with a generally rectangular shape along the length 86 of the sections 22 and 24. In addition, each gate section 22 and 24 includes ends 96 and 98 and sides 100 and 102 that taper away from the main body 94. In certain embodiments, each gate section 22 and 24 may include flat ends 96 and 98 and flat sides 100 and 102. End 96 forms a cavity 99 to surround a T-connector located at the end of the stem 42. End 98 also forms a cavity (not shown) to surround a connector (e.g., T-connector) located at the end of the stem 44. Further, each gate section 22 and 24 includes an opening 104, defining passage 38 through the gate 20, configured to allow the flow of fluid through the gate 20 when the gate 20 is aligned with the bore 32 of the body 18. In some embodiments, the opening 104 of each gate section 22 and 24 may include a diameter 106 equivalent to the diameter 36 of the bore 32 of the body 18. In other embodiments, the diameter 105 of the opening 104 of each gate section 22 and 24 may be smaller than the diameter 36 of the bore 32 of the body 18.

FIG. 6 illustrates the close fit between the body 18 and the gate 20 upon insertion of the gate 20 into the body 18. In particular, FIG. 6 is a cross-sectional view of the body 18 disposed about the gate 20 taken along line 6-6 of FIG. 5. The body 18 and the gate 20 are as described in FIGS. 1 and 5. In particular, the gate sections 22 and 24 are inserted within the opening 84 into the cavity 26 of body 18 with the length of 86 of the gate 20 crosswise (i.e. perpendicular) to the flow into passage 34 through the inlet 28 and outlet 30 of the body 18. The perimeter 88 of the cavity 26 and the opening 84 closely fit around both gate sections 22 and 24, thus, the gate 20 takes up most of the space within the cavity 26 of the body 18. In addition, as described above, the gate sections 22 and 24 include at least one biasing mechanism 48 disposed between them to bias each gate section 22 and 24 away from each other to form a double seal (e.g., seals 116 and 118) with the seat 54 of the body 18.

As mentioned above, these embodiments of the body 18 and gate 20 are employed with the actuation system 14 that includes the rolling actuator 12 to reduce the work required to mechanically operate the valve 10 (via rolling friction), in particular, large bore and/or high pressure gate valves 10. FIGS. 7 and 8 illustrate some, but not all, of the embodiments of the rolling actuator 12. FIG. 7 illustrates an embodiment of the rolling actuator 12 that includes a ball screw 128. Although FIG. 7 illustrates one embodiment of the ball screw 128, the ball screw 128 may include any type of ball screw mechanism. The ball screw 128 may be a part of or separate from the stem 42 (e.g., the operating stem) of the split gate valve 10. The illustrated ball screw 128 includes a screw shaft 130 including helical grooves 132 and a nut 134 including a plurality of ball bearings 136. The helical grooves 132 provide a pathway for the ball bearings 136 to travel along as the nut 134 receives a rotational input as indicated by arrow 138. The ball screw 128 may include a recirculation mechanism to recirculate the ball bearings 136 into the helical grooves 132. The ball screw 128 is configured to convert the rotational input 138 into a linear motion as indicated by arrow 140, while minimizing friction to provide a high mechanical efficiency. The ball screw 128 may be constructed of chrome steel, stainless steel, and/or alloy steels. The ball bearings 136 may be constructed of chrome steel, stainless steels, alloy steels, and/or ceramic.

Alternatively, FIG. 8 illustrates the rolling actuator 12 including a roller screw 150. Although FIG. 8 illustrates one embodiment of the roller screw 150, the roller screw 150 may include any type of roller screw mechanism. For example, the roller screw 150 may include a planetary roller screw, an inverted roller screw, a recirculating roller screw, or a bearing ring roller screw. The roller screw 150 may be part of or separate from the stem 42 (e.g., the operating stem) of the split gate valve 10. The roller screw 150 includes a screw shaft 152 including helical grooves 154 and a nut 156 including a plurality of rollers 158 disposed between opposite rings (e.g., ring 160). Each roller 158 may be threaded (e.g., threads 162) or grooved. The helical grooves 154 provide a pathway for the threaded or grooved rollers 158 to travel along as the nut 156 receives a rotational input as indicated by arrow 138. The roller screw 150 is configured to convert the rotational input 138 into a linear motion as indicated by arrow 140, while minimizing friction to provide a high mechanical efficiency. The roller screw 150 may be constructed of chrome steel, stainless steel, and/or alloy steels. As mentioned above, the rolling actuator 12 (e.g., the ball screw 128 or the roller screw 150) is configured to reduce friction and to covert rotational input (e.g., received by the drive 16) into linear motion to move the pair of gate sections 22 and 24 between the open and closed positions within the split gate valve 10. Thus, the rolling actuator 12 reduces the work required to mechanically operate the split gate valve 10, in particular, large bore and/or high pressure gate valves 10.

As discussed above, the disclosed embodiments include the split gate valve 10 that includes the pair of gate sections 22 and 24 (e.g., slab gates) coupled together and configured to move together within the cavity 26 of the split gate valve 10 between open and closed positions. The split gate valve 10 includes the rolling actuator 12 to reduce the amount of mechanical force or torque required to move the split gate between the open and closed positions in large bore and/or high pressure valves. In addition, the gate sections 22 and 24 form a double seal against the seat of 54 of the split gate valve 10. The pair of gates sections also allows the split gate valve 10 to control flows of two different fluids with each gate section 22 and 24. In addition, the double seal allows the isolation of a fluid within the cavity 26 of the split gate valve 10. Further, the double seal allows testing of each seal at the same time by filling the cavity of the split gate valve 10 with a fluid. In certain embodiments, the body 18 of the split gate valve 10 includes a rectangular opening configured to tightly fit the gate 20 allowing a reduction in size of the body 18, thus, minimizing the amount of deflection experienced by the split gate valve 10 under load pressure.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a split gate valve, comprising:
      a body having a bore and a cavity;
      first and second gate sections coupled together and configured to move together within the cavity of the split gate valve along a path of travel between an open position and a closed position relative to the bore, wherein the first and second gate sections comprise respective first and second openings that selectively align with the bore in the open position;
      a biasing mechanism disposed between the first and second gate sections, wherein the biasing mechanism biases the first and second gate sections away from one another to form opposite seals with opposite seats of the split gate valve along an entirety of the path of travel;
      a rolling actuator configured to reduce friction and to convert a rotational input into a linear motion to move the first and second gate sections along the path of travel between the open and closed positions, wherein the rolling actuator comprises a plurality of rollers or a plurality of balls disposed along a spiraling path; and
      wherein the split gate valve comprises at least one of:
         the biasing mechanism comprises a cam mechanism;
         the biasing mechanism comprises an elastic material that is not a spring; or the cavity has a substantially rectangular perimeter with four flat interior sides that extend along an axis through the body from a first side toward a second side, and the first and second gate sections collectively define four flat exterior sides disposed along the four flat interior sides of the cavity.

2. The system of claim 1, wherein the bore has a diameter of at least 4 inches, or the split gate valve has a pressure rating of at least 10,000 psi, or a combination thereof.

3. The system of claim 1, wherein the bore has a diameter of at least 9 inches, or the split gate valve has a pressure rating of at least 5,000 psi, or a combination thereof.

4. The system of claim 1, wherein the body has a rectangular perimeter along an entire length from the first side to the second side of the body, the first and second sides are rectangular, the body has an opening into the cavity on the first side, and the opening supports the first and second gate sections.

5. The system of claim 4, wherein the axis is an axis of axial movement of the first and second gate sections along the path of travel through the body from the first side toward the second side.

6. The system of claim 1, wherein the biasing mechanism comprises at least one spring oriented crosswise to the path of travel of the first and second gate sections.

7. The system of claim 1, wherein the rolling actuator is located outside the cavity of the split gate valve in a housing of an actuation system separate from the split gate valve, and a shaft extends between the actuation system and the first and second gate sections.

8. The system of claim 1, wherein the rolling actuator is located completely inside the cavity within an exterior boundary of the split gate valve.

9. The system of claim 1, wherein the rolling actuator comprises a ball screw and the plurality of balls.

10. The system of claim 1, wherein the rolling actuator comprises a roller screw and the plurality of rollers.

11. The system of claim 1, wherein the split gate valve, when in operation, supplies a fluid into the cavity to test both of the opposite seals at a same time.

12. The system of claim 1, wherein the split gate valve, when in operation, supplies a fluid into the cavity to isolate the fluid within the cavity.

13. The system of claim 1, wherein the split gate valve, when in operation, supplies a fluid into the cavity to bias the first and second gate sections away from one another to form the opposite seals with the opposite seats of the split gate valve.

14. The system of claim 1, wherein the biasing mechanism comprises the elastic material that is not the spring.

15. The system of claim 1, wherein the biasing mechanism comprises the cam mechanism.

16. The system of claim 1, comprising a coupling mechanism disposed between the first and second gate sections, wherein the coupling mechanism guides movement of the first and second gate sections toward and away from one another in a crosswise direction relative to the path of travel.

17. The system of claim 16, wherein the coupling mechanism comprises a pin extending into slots within the first and second gate sections.

18. The system of claim 17, wherein the coupling mechanism and the biasing mechanism are disposed adjacent one another.

19. The system of claim 1, wherein the first gate section is made of a first material, the second gate section is made of a second material, and the first and second materials are different from one another.

20. The system of claim 1, comprising a gearbox coupled to a drive, wherein the gear box is coupled to the split gate valve between the drive and the rolling actuator.

21. The system of claim 1, comprising a first stem coupled to a first end portion of the first and second gate sections and a second stem coupled to a second end portion of the first and second gate sections, wherein axes of the first and second stems are aligned with an axis of axial movement of the first and second gate sections along the path of travel through the split gate valve.

22. The system of claim 21, wherein the first or second end portion comprises a T-connector.

23. The system of claim 1, wherein the biasing mechanism is recessed into the first and second gate sections.

24. The system of claim 1, wherein the biasing mechanism comprises a plurality of biasing elements disposed at different locations between the first and second gate sections.

25. The system of claim 1, wherein:
the split gate valve comprises opposite first and second stem portions extending axially away from opposite ends of the first and second gate sections relative to an axis of axial movement of the first and second gate sections along the path of travel; and
the biasing mechanism comprises a spring, the elastic material, or a combination thereof, that provides an outward biasing force in opposite directions crosswise to the axis of axial movement of the first and second gate sections along the path of travel.

26. The system of claim 1, wherein:
the split gate valve comprises opposite first and second stem portions extending axially away from opposite ends of the first and second gate sections relative to the axis of axial movement of the first and second gate sections along the path of travel; and
the body has an opening into the cavity on the first side, wherein the body has a cross-section with a rectangular outer perimeter that extends directly from the first side along the axis toward the second side of the body, and the cross-section is oriented in a plane perpendicular to the axis.

27. A system, comprising:
a split gate valve, comprising:
a body having a bore and a cavity;
first and second gate sections coupled together and configured to move together within the cavity of the split gate valve along a path of travel between an open position and a closed position relative to the bore, wherein the first and second gate sections comprise respective first and second openings that selectively align with the bore in the open position;
at least one biasing element disposed between the first and second gate sections, wherein the at least one biasing element biases the first and second gate sections away from one another in opposite directions that are crosswise to an axis along an entirety of the path of travel, and the at least one biasing element comprises an elastic material that is not a spring; and
a rolling actuator configured to move the first and second gate sections along the path of travel between the open and closed positions, wherein the rolling actuator comprises a plurality of rollers or a plurality of balls disposed along a spiraling path.

28. The system of claim 27, wherein the at least one biasing element further comprises at least one spring, a cam mechanism, or a combination thereof.

29. The system of claim 27, wherein the split gate valve comprises first and second stem portions extending axially away from opposite ends of the first and second gate sections relative to the axis of the path of travel of the first and second gate sections.

30. A system, comprising:
a split gate valve, comprising:
a body having a bore and a cavity, wherein the cavity extends in an axial direction along an axis from an opening in a first side of the body toward a second side of the body, a cross-section of the body defines an inner perimeter about the cavity and an outer perimeter about the body, the cross-section is oriented in a plane perpendicular to the axis, and the inner and outer perimeters of the cross-section have a substantially rectangular shape that extends in the axial direction along the axis directly from the first side toward the second side;
first and second gate sections coupled together and configured to move together in the axial direction within the cavity of the split gate valve along a path of travel between an open position and a closed position, wherein the first and second gate sections comprise respective first and second openings that selectively align with the bore in the open position;
at least one biasing element disposed between the first and second gate sections, wherein the at least one biasing element biases the first and second gate sections away from one another in opposite directions that are crosswise to the axis along an entirety of the path of travel;
a rolling actuator configured to move the first and second gate sections along the path of travel between the open and closed positions, wherein the rolling actuator comprises a plurality of rollers or a plurality of balls disposed along a spiraling path.

31. The system of claim 30, wherein the at least one biasing element comprises a cam mechanism, an elastic material that is not a spring, or a combination thereof.

32. A system, comprising:
a split gate valve, comprising:
a body having a bore and a cavity, wherein the cavity has a substantially rectangular perimeter with four flat interior sides that extend along an axis through the body from a first side toward a second side;
first and second gate sections coupled together and configured to move together within the cavity of the split gate valve along the axis through the body with a path of travel between an open position and a closed position relative to the bore, wherein the first and second gate sections comprise respective first and second openings that selectively align with the bore in the open position, and the first and second gate sections collectively define four flat exterior sides disposed along the four flat interior sides of the cavity; and
a biasing mechanism disposed between the first and second gate sections, wherein the biasing mechanism biases the first and second gate sections away from one another to form opposite seals with opposite seats of the split gate valve.

33. The system of claim 32, comprising a rolling actuator configured to reduce friction and to convert a rotational input into a linear motion to move the first and second gate sections along the path of travel between the open and closed positions, wherein the rolling actuator comprises a plurality of rollers or a plurality of balls disposed along a spiraling path.

34. The system of claim 32, wherein the body has a rectangular perimeter along an entire length from the first side to the second side of the body, the body has an opening into the cavity on the first side, and the opening supports the first and second gate sections.

35. A system, comprising:
a split gate valve, comprising:
a body having a bore and a cavity;
first and second gate sections coupled together and configured to move together within the cavity of the split gate valve along a path of travel between an open position and a closed position relative to the bore, wherein the first and second gate sections comprise respective first and second openings that selectively align with the bore in the open position;
a biasing mechanism disposed between the first and second gate sections, wherein the biasing mechanism biases the first and second gate sections away from one another to form opposite seals with opposite seats of the split gate valve, and the biasing mechanism comprises a cam mechanism; and
a rolling actuator configured to reduce friction and to convert a rotational input into a linear motion to move the first and second gate sections along the path of travel between the open and closed positions, wherein the rolling actuator comprises a plurality of rollers or a plurality of balls disposed along a spiraling path.

36. The system of claim 35, wherein the cavity has a substantially rectangular perimeter with four flat interior sides that extend along an axis through the body from a first side toward a second side, and the first and second gate sections collectively define four flat exterior sides disposed along the four flat interior sides of the cavity.

* * * * *